United States Patent
Liu et al.

(10) Patent No.: US 12,019,944 B2
(45) Date of Patent: Jun. 25, 2024

(54) METHOD FOR OPERATING MIRRORED CONTENT UNDER MIRROR MODE AND COMPUTER READABLE STORAGE MEDIUM

(71) Applicant: HTC Corporation, Taoyuan (TW)

(72) Inventors: Ming-Te Liu, Taoyuan (TW); Po-Hung Chen, Taoyuan (TW); Kuo-Jung Chen, Taoyuan (TW); Hsing-Ju Chou, Taoyuan (TW); Shih-Hsi Chen, Taoyuan (TW); Chiming Ling, Taoyuan (TW)

(73) Assignee: HTC Corporation, Taoyuan (TW)

( * ) Notice: Subject to any disclaimer, the term of this patent is extended or adjusted under 35 U.S.C. 154(b) by 107 days.

(21) Appl. No.: 17/943,208

(22) Filed: Sep. 13, 2022

(65) Prior Publication Data
US 2023/0185513 A1    Jun. 15, 2023

Related U.S. Application Data

(60) Provisional application No. 63/289,153, filed on Dec. 14, 2021.

(51) Int. Cl.
*G06F 3/14* (2006.01)
*G06F 3/03* (2006.01)

(52) U.S. Cl.
CPC .......... *G06F 3/1454* (2013.01); *G06F 3/0321* (2013.01)

(58) Field of Classification Search
CPC ...... G06F 3/1454; G06F 3/0321; G06F 3/011; G06F 3/0346; G09G 2340/10
See application file for complete search history.

(56) References Cited

U.S. PATENT DOCUMENTS

| | | | | |
|---|---|---|---|---|
| 5,754,828 | A * | 5/1998 | Adan | G06F 3/038 703/24 |
| 8,840,016 | B1 * | 9/2014 | Schott | G06Q 20/3278 235/379 |
| 9,047,728 | B1 * | 6/2015 | Irudayam | G06Q 20/3221 |
| 11,036,344 | B1 * | 6/2021 | Portelli | G06F 3/0482 |

(Continued)

OTHER PUBLICATIONS

Lang, Ben, "Vive Focus 2.0 Update Brings Bevy of New Features: Phone Mirroring, Pass-through Video & More", May 27, 2018 (https://www.roadtovr.com/vive-focus-system-update-2-0-phone-mirroring-pass-through-video-and-more/).*

*Primary Examiner* — Sarah Lhymn
(74) *Attorney, Agent, or Firm* — JCIPRNET

(57) ABSTRACT

The embodiments of the disclosure provide a method for operating a mirrored content under a mirror mode and a computer readable storage medium. The method includes: enabling a touch capturing function on the smart device, wherein the touch capturing function intercepts a touch event inputted to the smart device; in response to determining that a raw touch event is intercepted by the smart device, translating the raw touch event to a first touch event and sending the first touch event to a host, wherein a display screen of the smart device is mirrored to a visual content shown by the host, and the first touch event triggers the host to report a second touch event happened in the visual content; disabling the touch capturing function and receiving the second touch event from the host; and performing a first operation in response to the second touch event and enabling the touch capturing function on the smart device.

11 Claims, 5 Drawing Sheets

(56) References Cited

U.S. PATENT DOCUMENTS

| | | | |
|---|---|---|---|
| 11,145,126 B1* | 10/2021 | Bramwell | G06F 3/147 |
| 2006/0047836 A1* | 3/2006 | Rao | H04L 67/14 |
| | | | 709/229 |
| 2008/0244702 A1* | 10/2008 | Kropivny | H04L 12/1822 |
| | | | 726/3 |
| 2012/0042252 A1* | 2/2012 | Neerudu | G06F 3/1454 |
| | | | 715/733 |
| 2012/0042275 A1* | 2/2012 | Neerudu | G06F 3/1454 |
| | | | 715/781 |
| 2013/0093776 A1* | 4/2013 | Chakraborty | G06F 9/452 |
| | | | 345/520 |
| 2013/0178195 A1* | 7/2013 | Luna | H04W 28/06 |
| | | | 455/414.1 |
| 2013/0268994 A1* | 10/2013 | Cooper | H04L 63/20 |
| | | | 726/1 |
| 2014/0046842 A1* | 2/2014 | Irudayam | G06Q 20/32 |
| | | | 235/379 |
| 2014/0223490 A1* | 8/2014 | Pan | H04N 21/8186 |
| | | | 345/173 |
| 2015/0012831 A1* | 1/2015 | Boggess | G06F 3/1454 |
| | | | 715/733 |
| 2017/0300287 A1* | 10/2017 | Yan | G06F 3/0488 |
| 2018/0197157 A1* | 7/2018 | Magee | G07D 11/00 |
| 2018/0205756 A1* | 7/2018 | Northway, Jr. | H04L 63/1416 |
| 2019/0129812 A1* | 5/2019 | Subrahmanyam | G06F 11/1438 |
| 2019/0138182 A1* | 5/2019 | Kropivny | A63F 13/00 |
| 2019/0163576 A1* | 5/2019 | Compton | G06F 11/1469 |
| 2020/0126291 A1* | 4/2020 | Nguyen | G06T 19/20 |
| 2020/0285438 A1* | 9/2020 | Lagnado | G09G 3/3406 |
| 2020/0374238 A1* | 11/2020 | Momchilov | H04L 47/781 |
| 2023/0185513 A1* | 6/2023 | Liu | G06F 3/0321 |
| | | | 345/520 |

\* cited by examiner

METHOD FOR OPERATING MIRRORED CONTENT UNDER MIRROR MODE AND COMPUTER READABLE STORAGE MEDIUM

CROSS-REFERENCE TO RELATED APPLICATION

This application claims the priority benefit of U.S. provisional application Ser. No. 63/289,153, filed on Dec. 14, 2021. The entirety of the above-mentioned patent application is hereby incorporated by reference herein and made a part of this specification.

BACKGROUND

1. Field of the Invention

The present disclosure generally relates to a method for interacting with visual contents, in particular, to a method for operating a mirrored content under a mirror mode and a computer readable storage medium.

2. Description of Related Art

See FIG. 1, which shows a schematic diagram of a mirror mode. In FIG. 1, when the smart device 110 (which may be a smart device) and the host 120 (which may be a head-mounted display (HMD)) are operating under the mirror mode, the display screen 112 of the smart device 110 can be mirrored to the visual content 121 provided/shown by the host 120.

The host 120 can be used to provide various reality services, such as virtual reality (VR), augmented reality (AR) or the like, and the visual content 121 may include a specific region 122 for showing a content mirrored from the display screen 111. In this case, the variation happens on the display screen 111 would be mapped to the content shown in the specific region 122.

Conventionally, the user of the host 120 can use a handheld controller 130 to interact with the smart device 110 via interacting with the specific region 122. For example, the visual content 121 may include a controller representative object 131 corresponding to the handheld controller 130, and the user may use the controller representative object 131 to interact with specific region 121 by, for example, triggering a region 123 (which corresponds to an application 112) shown in the specific region 121 with a raycast 131a.

For example, the user may press a specific button (e.g., a confirming button) on the controller 130 while using the raycast 131a to point to the region 123 corresponding to the application 112. In this case, the application 112 would be accordingly activated on the smart device 110.

However, in the scenario shown in FIG. 1, the user needs to use the handheld controller 130 to interact with the host 120, which is inconvenient to the user.

SUMMARY OF THE INVENTION

Accordingly, the disclosure is directed to a method for operating a mirrored content under a mirror mode and a computer readable storage medium, which may be used to solve the above technical problems.

The embodiments of the disclosure provide a method for operating a mirrored content under a mirror mode, including: enabling, by a smart device, a touch capturing function on the smart device, wherein the touch capturing function intercepts a touch event inputted to the smart device; in response to determining that a raw touch event is intercepted by the smart device, translating, by the smart device, the raw touch event to a first touch event and sending, by the smart device, the first touch event to a host, wherein a display screen of the smart device is mirrored to a visual content shown by the host, and the first touch event triggers the host to report a second touch event happened in the visual content; disabling, by the smart device, the touch capturing function and receiving, by the smart device, the second touch event from the host; and performing, by the smart device, a first operation in response to the second touch event and enabling, by the smart device, the touch capturing function on the smart device.

The embodiments of the disclosure provide a method for operating a mirrored content under a mirror mode, including: showing, by a host, a visual content, wherein a specific region of the visual content is mirrored from a display screen on a smart device, and the visual content comprises a controller representative object corresponding to the smart device; in response to receiving a first touch event from the smart device, obtaining, by the host, a specific position indicated by the controller representative object; in response to determining that the specific position is within the specific region, accordingly generating, by the host, a second touch event; sending, by the host, the second touch event to the smart device, wherein the second touch event triggers the smart device to perform a first operation in response to the second touch event.

The embodiments of the disclosure provide a computer readable storage medium, the computer readable storage medium recording an executable computer program, the executable computer program being loaded by a smart device to perform steps of: enabling a touch capturing function on the smart device, wherein the touch capturing function intercepts a touch event inputted to the smart device; in response to determining that a raw touch event is intercepted by the smart device, translating the raw touch event to a first touch event and sending the first touch event to a host, wherein a display screen of the smart device is mirrored to a visual content shown by the host, and the first touch event triggers the host to report a second touch event happened in the visual content; disabling the touch capturing function and receiving the second touch event from the host; and performing a first operation in response to the second touch event and enabling the touch capturing function on the smart device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
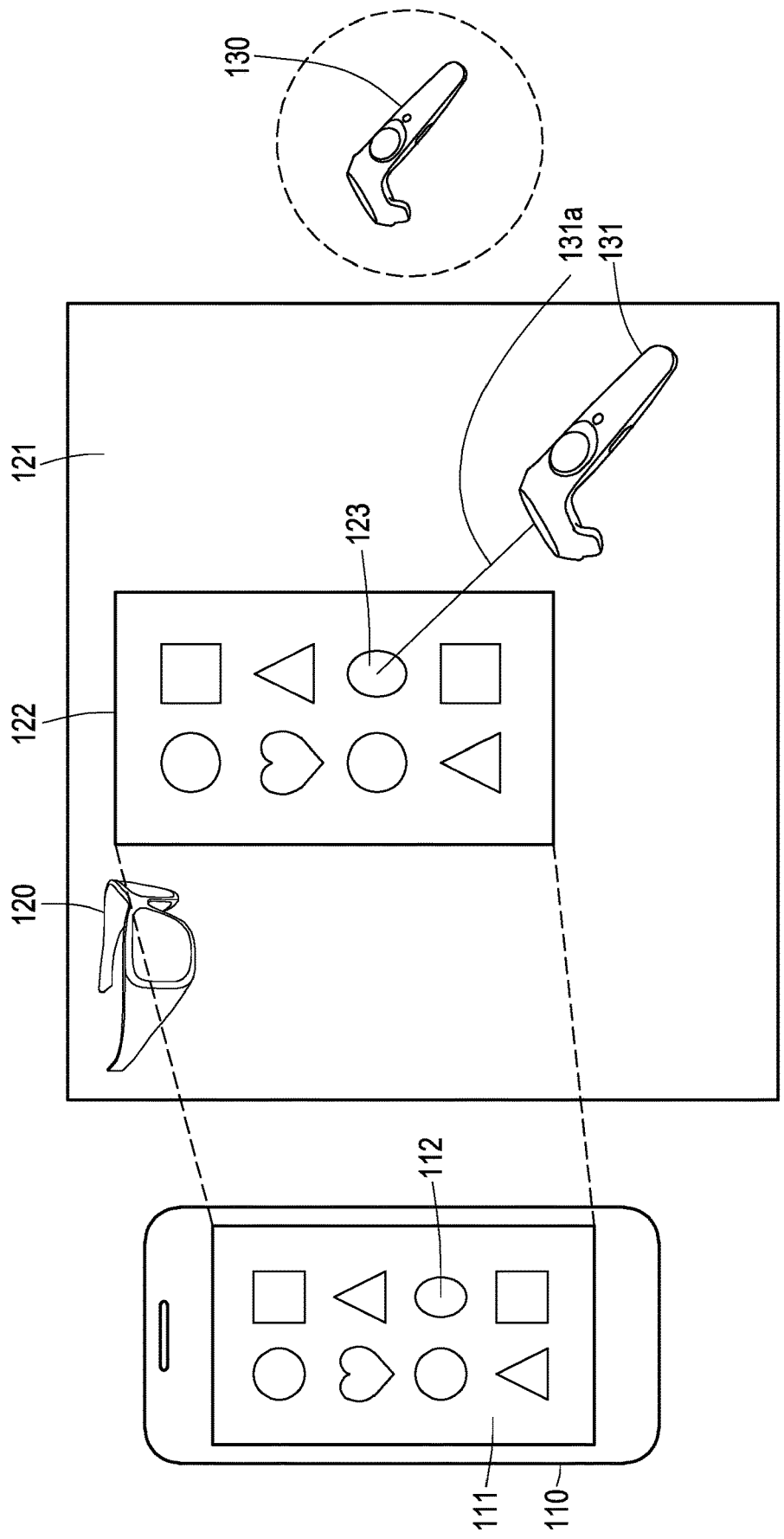
FIG. 1 shows a schematic diagram of a mirror mode.

Reference will now be made in detail to the present preferred embodiments of the invention, examples of which are illustrated in the accompanying drawings. Wherever possible, the same reference numbers are used in the drawings and the description to refer to the same or like parts.

Figure 2:
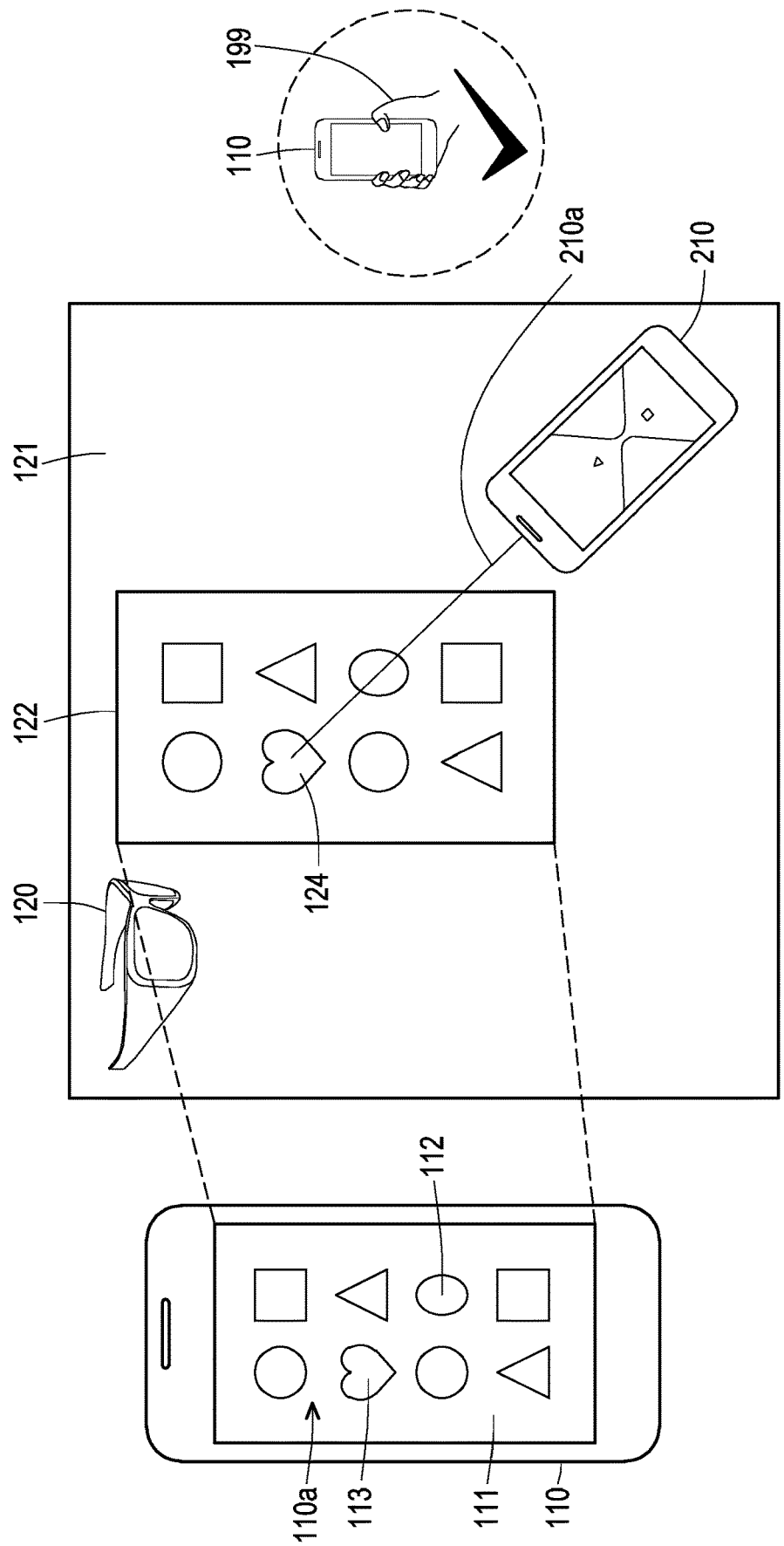
FIG. 2 shows a schematic diagram of using the smart device to replace the handheld controller in FIG. 1 according to an embodiment of the disclosure.

See FIG. 2, which shows a schematic diagram of using the smart device to replace the handheld controller in FIG. 1 according to an embodiment of the disclosure. In FIG. 2, the smart device 110 can be used to replace the handheld controller 130 in FIG. 1. That is, the user 199 can hold the smart device 110 in hand and use the smart device 110 in the way of using the handheld controller 130.

Specifically, the visual content 121 shown by the host 120 may include a controller representative object 210 corresponding to the smart device 110, and the host 120 may move the controller representative object 210 in response to the movement of the smart device 110.

In one embodiment, the smart device 110 may collect the motion data thereof via a motion detection circuit (e.g., inertia measurement unit (IMU)) and provide the collected motion data to the host 120. In this case, the host 120 can determine the movement of the controller representative object 210 in the visual content 121 based on the motion data from the smart device 110. Therefore, when the user 199 moves the smart device 110 in the real world, the controller representative object 210 would be correspondingly moved in the virtual world presented by the visual content 121.

Similar to the scenario in FIG. 1, the controller representative object 210 can be designed with a raycast 210a for the user 199 to point to any desired position in the visual content 121. In FIG. 2, the user 199 may use the raycast 210a to trigger a desired application/function on the smart device 110 via interacting with the specific region 122 with the controller representative object 210 and/or the raycast 210a.

However, since the smart device 110 has its own user interface 110a, the user may accidentally activate undesired function/application on the smart device 110 while interacting with the specific region 122 under the mirror mode.

For example, if the user 199 wants to trigger the application 113 on the smart device 110 while wearing the host 120 (i.e., the user 199 may not be able to directly see the smart device 110), the user 199 may touch the display screen 111 (which may be a touch screen) on a particular position while using the raycast 210a to point to the region 124 corresponding to the application 113. However, since the user 199 may not be able to directly see the smart device 110, if the particular position where the user 199 touches on the display screen 111 corresponds to the application 112, the smart device 110 might actually activate the application 112 in response to the touch event inputted by the user 199, rather than the desired application 113 of the user 199.

Since the display screen 111 is mirrored to the specific region 122 via, for example, streaming the screen frames of the smart device 110 to host 120, the user 199 would see that the specific region 122 shows a result of the smart device 110 launching the application 112, instead of the result of launching the application 113 corresponding to the region 124 pointed by the raycast 210a.

Accordingly, the embodiments of the disclosure provide a solution for solving the above technical problem, which would be introduced in the following.

Figure 3:
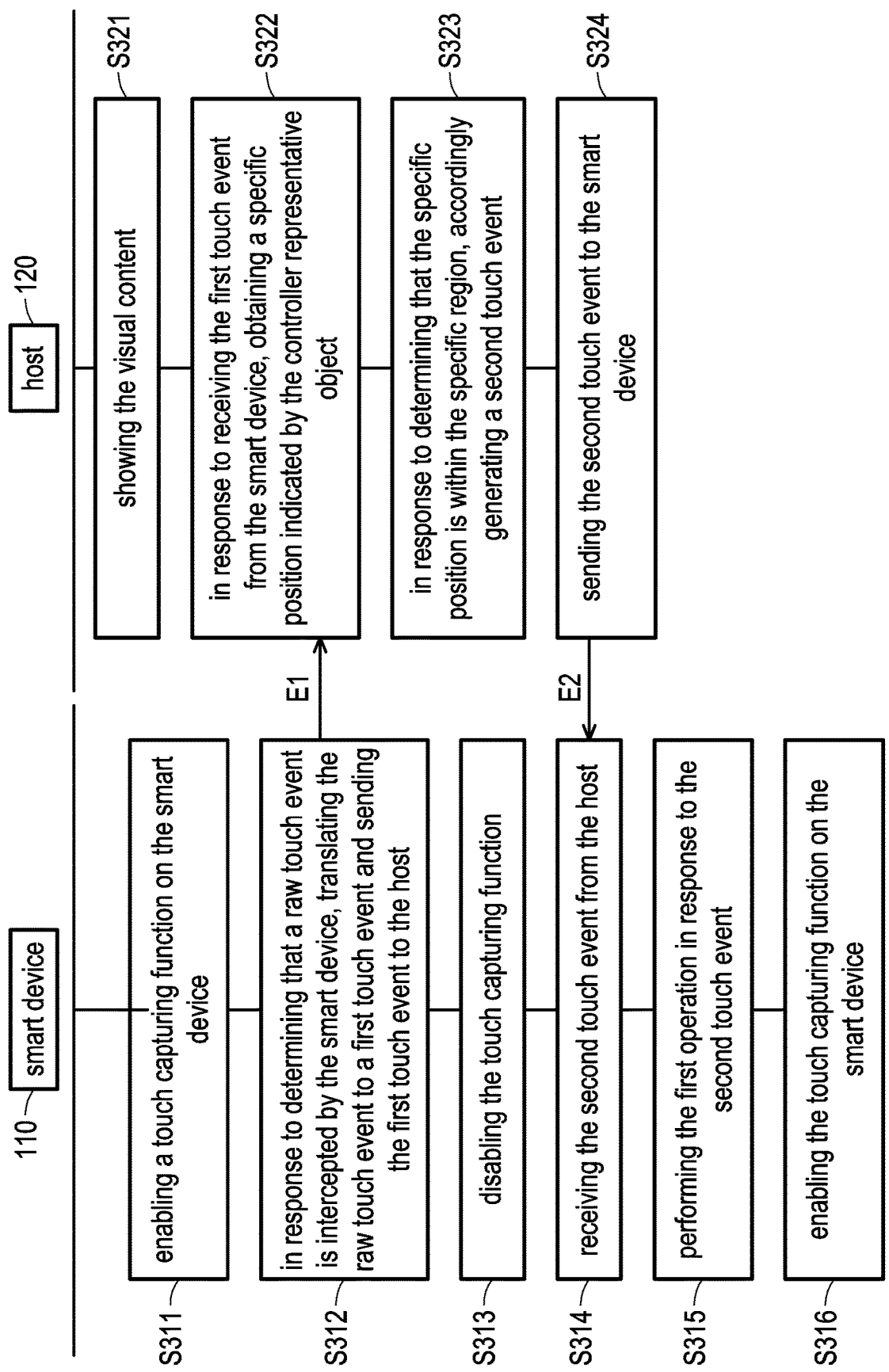
FIG. 3 shows a flow chart of the method for operating a mirrored content under a mirror mode according to an embodiment of the disclosure.

See FIG. 3, which shows a flow chart of the method for operating a mirrored content under a mirror mode according to an embodiment of the disclosure. The method of this embodiment may be executed by the smart device 110 and the host 120 in FIG. 2, and the details of each step in FIG. 3 will be described below with the components shown in FIG. 2.

In step S321, the host 120 shows the visual content 121, wherein the visual content 121 can be the content of the reality service (e.g., the VR service) provided by the host 120. In the embodiment, the smart device 110 and the host 120 are assumed to be operating under the mirror mode. That is, the display screen 111 of the smart device 110 is mirrored to the specific region 122 of the visual content 121. In other embodiments, the aspect (e.g., the size and position) of the specific region 122 can be arbitrarily designed based on the designer's requirements.

In step S311, the smart device 110 may enable a touch capturing function on the smart device 110, wherein the touch capturing function intercepts any touch event inputted to the smart device 110.

Figure 4:
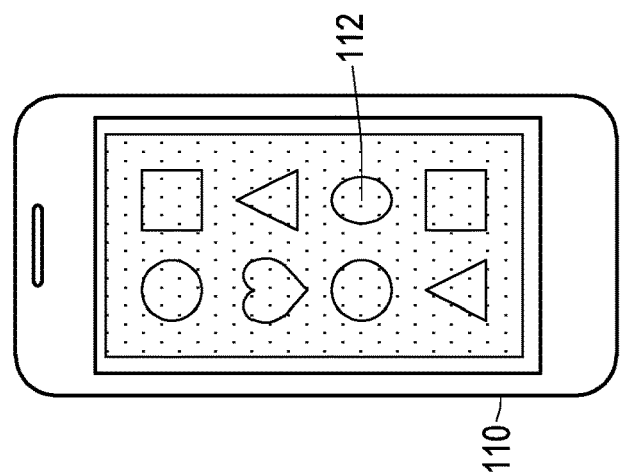
FIG. 4 shows a schematic diagram of enabling the touch capturing function according to an embodiment of the disclosure.
Figure 4:
Figure 4:
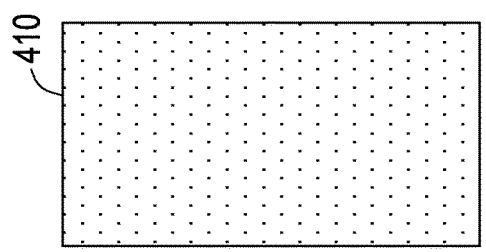
Figure 4:
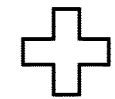
Figure 4:
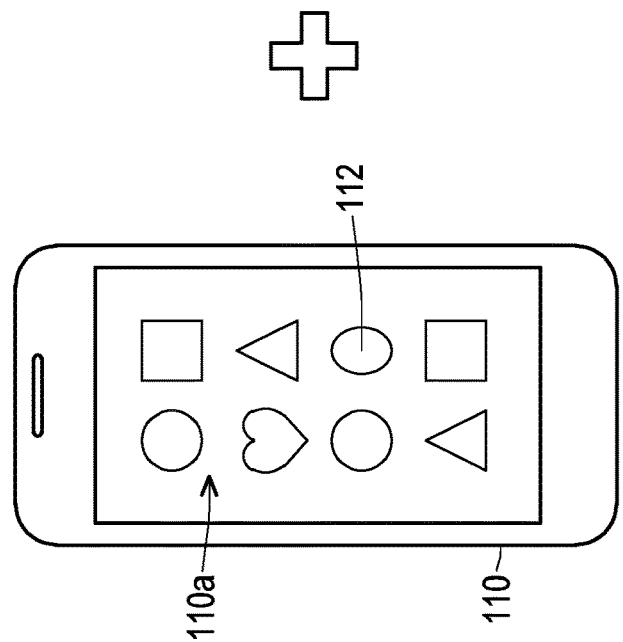

See FIG. 4, which shows a schematic diagram of enabling the touch capturing function according to an embodiment of the disclosure. In FIG. 4, the smart device 110 may enable the touch capturing function via overlaying the user interface 110a of the smart device 110 with a cover layer 410.

In this embodiment, the cover layer 410 may be transparent, and the size/shape/position thereof may be arbitrarily designed based on the designer's requirements. In one embodiment, the size of the cover layer 410 may be designed to cover all of the user interface 110a, but the disclosure is not limited thereto.

In one embodiment, during the touch capturing function is enabled, any touch event happened on the user interface 110a would be intercepted and would not be used to directly control the smart device 110. For example, if the user 199 performs a touch operation on a first touch coordinate on the cover layer 410 (i.e., the user 199 touches the cover layer 410 on the position corresponding to the first touch coordinate), the smart device 110 would not directly operate based on the first touch coordinate. Specifically, assuming that the first touch coordinate locates on the application 112 of the user interface 110a, the smart device 110 would not launch the application 112 in response to the touch operation. In brief, the user 199 would not be allowed to directly operate the smart device 110 via touching the smart device 110.

Instead of directly performing operation in response to the touch operation, the smart device 110 performs steps S312. In step S312, in response to determining that the a raw touch event (corresponding to the touch operation) is intercepted by the smart device 110, the smart device 110 translates the raw touch event to a first touch event E1 and sends the first touch event E1 to the host 120.

In one embodiment, the intercepted raw event may be the touch event of the smart device 110. Since the raw touch event has been intercepted, the smart device 110 will not perform the operation originally corresponding to the raw event for avoiding some problems such as activating undesired application of the user 199. For example, assuming that the raw touch event happens on the application 112 but the user 199 actually wants to launch another function or application, the smart device 110 would not launch the application 112 in response to the raw touch event.

Instead, the smart device 110 translates the raw touch event to the first touch event E1 and sends the first touch event E1 to the host 120. In one embodiment, the cover layer 410 can be disposed with several controlling regions corresponding to different functions, and the smart device 110 may determine which of the controlling regions corresponds to the raw event and determine the first touch event E1 according to the corresponding function. For example, if the raw touch event corresponds to the controlling region for a function of confirming, the smart device 110 may determine the first touch event E1 to be a touch event for confirming. For another example, if the raw touch event corresponds to the controlling region for a function of triggering, the smart device 110 may determine the first touch event E1 to be a touch event for triggering. For yet another example, if the raw touch event corresponds to the controlling region for a function of activating the system menu, the smart device 110 may determine the first touch event E1 to be a touch event for activating the system menu, but the disclosure is not limited thereto.

In step S322, in response to receiving the first touch event E1 from the smart device 110, the host 120 obtains a specific position indicated by the controller representative object 210. In FIG. 2, the specific position indicated by the controller representative object 210 may be the position pointed by the raycast 210*a* in the visual content 121, but the disclosure is not limited thereto.

In step S323, in response to determining that the specific position is within the specific region 122 (i.e., the region mirrored from the display screen 111), the host 120 accordingly generates a second touch event E2, wherein the second touch event E2 corresponds to a touch coordinate of the specific position relative to the specific region 122.

In one embodiment, the display screen 111 may be designed with an origin (e.g., the top-left corner of the display screen 111), and the host 120 can accordingly determine an origin within the specific region 122 (e.g., the top-left corner of the specific region 122). In this case, the host 120 may characterize the specific position as a coordinate relative to the origin of the specific region 122 and use this coordinate as the touch coordinate corresponding to the second touch event E2, but the disclosure is not limited thereto.

In one embodiment, the second touch event E2 may include the touch coordinate of the specific position pointed by the raycast 210*a* and/or the click event corresponding to the touch operation. In one embodiment, in response to determining that the click event corresponds to a dragging operation inputted by the user 199 on the smart device 110, the second touch event E2 may, for example, indicate that the user 199 is performing the dragging operation and the touch coordinate of the specific position, such that the smart device 110 can be controlled to, for example, scrolling pages according to the second touch event E2, but the disclosure is not limited thereto.

In the scenario of FIG. 2, since the specific position pointed by the raycast 210*a* is assumed to be within the region 124, the second touch event E2 generated by the host 120 may be used to simulate the situation of the user 199 touches a corresponding touch coordinate on the display screen 111, which may be a touch coordinate corresponding to the application 113.

In step S324, the host 120 sends the second touch event E2 to the smart device 110, wherein the second touch event E2 triggers the smart device 110 to perform a first operation in response to the second touch event E2. However, if the touch capturing function (e.g., the cover layer 410) is still enabled while receiving the second touch event E2, the second touch event E2 would also be intercepted, such that the smart device 110 would not be able to perform the first operation in response to the second touch event E2. More specifically, if the touch capturing function is still enabled when the host 120 transmits the second touch event E2 to the smart device 110, the smart device 110 may treat the second touch event E2 in the way of treating the raw touch event. In this case, the smart device 110 may translate the second touch event E2 to another touch event and send it to the host 120 without performing the first operation corresponding to the real operating intention of the user 199.

Therefore, after the smart device 110 performs step S312, the smart device 110 can subsequently perform step S313 to disable the touch capturing function (e.g., removing the cover layer 410) and perform step S314 to receive the second touch event E2 from the host 120. Accordingly, the second touch event E2 would not be intercepted by the touch capturing function and can be used to actually control the smart device 110.

In step S315, the smart device 110 performs the first operation in response to the second touch event E2. In one embodiment, in response to determining that the touch coordinate corresponds to a specific application or a specific function in the user interface 110*a* of the smart device 110, the smart device 110 can activate the specific application or the specific function as performing the first operation.

For example, the smart device 110 can launch the application 113 corresponding to the specific position indicated by the controller representative object 210. Since the display screen 111 is mirrored to the specific region 122, the user 199 would see that the specific region 122 shows a result of the smart device 110 launching the application 113. That is, the embodiments of the disclosure provide a solution for the user to use the smart device 110 as a handheld controller under the mirror mode.

In some embodiments, the cover layer 410 can be designed with one or more controlling regions for the user 199 to activate particular system functions of the reality service provided by the host 120.

In one embodiment, in response to determining that the first touch event E1 happens on a first touch coordinate on the cover layer 410, the smart device 110 may obtain a first controlling region of the controlling region where the first touch coordinate locates and notify the host 120 to activate a first system function corresponding to the first controlling region.

Figure 5:
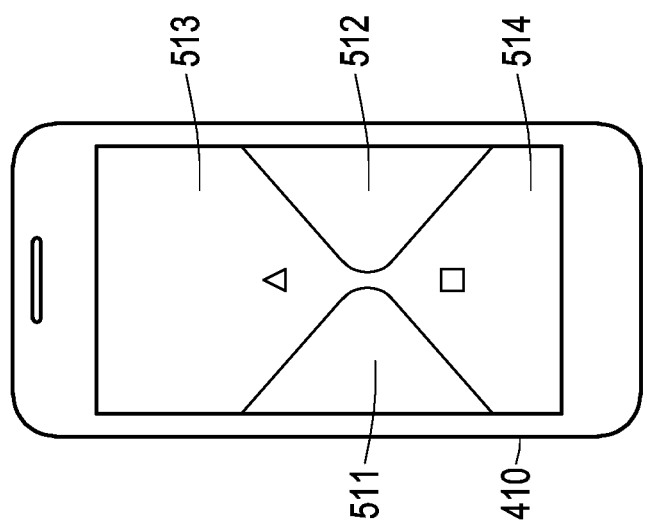
FIG. 5 shows the controlling regions on the cover layer according to an embodiment of the disclosure.

See FIG. 5, which shows the controlling regions on the cover layer according to an embodiment of the disclosure. In FIG. 5, the cover layer 410 may include controlling regions 511-514. In the embodiments of the disclosure, since the user 199 may not be able to see the controlling regions 511-514 due to wearing the host 120, the sizes of the controlling regions 511-514 may be designed to be large enough for facilitating the user to touch, but the disclosure is not limited thereto.

In one embodiment, the controlling region 511 may be used as the confirming button disposed on the handheld controller 130 in FIG. 1. In this case, the user 199 may touch the controlling region 511 while using the raycast 210*a* to point to the region 124 to trigger the smart device 110 to launch the application 113, but the disclosure is not limited thereto. In addition, the controlling region 512 may be designed with the same function as the controlling region 511, but the disclosure is not limited thereto. In one embodiment, the first touch event E1 translated from the corresponding raw touch event when the user 199 touches the controlling region 511 or 512 may be determined by the smart device 110 to be a touch event for confirming, as mentioned in the above.

In one embodiment, the controlling region 513 may correspond to the system function of showing a system menu. In this case, when the user 199 touches the controlling region 513, the smart device 110 may determine that the coordinate where the user 199 touches on the cover layer 140 corresponds to the controlling region 513, and the smart device 110 may notify the host 120 to show the system menu of the reality service provided by the host 120, but the disclosure is not limited thereto. In one embodiment, the first touch event E1 translated from the corresponding raw touch event when the user 199 touches the controlling region 513 may be determined by the smart device 110 to be a touch event for activating the system menu, as mentioned in the above.

In one embodiment, the controlling region 514 may correspond to the system function of showing recently opened applications. In this case, when the user 199 touches the controlling region 514, the smart device 110 may determine that the coordinate where the user touches on the cover layer 140 corresponds to the controlling region 514, and the smart device 110 may notify the host 120 to show the recently opened application on the host 120, but the disclosure is not limited thereto. In one embodiment, the first touch event E1 translated from the corresponding raw touch event when the user 199 touches the controlling region 514 may be determined by the smart device 110 to be a touch event for showing the recently opened applications.

In some embodiments, the controlling regions 511-514 on the cover layer 140 may be invisible/transparent. In this case, although the cover layer 410 is overlaid on the user interface 110a, people near the smart device 110 can only see the user interface 110a, but not the controlling regions 511-514, but the disclosure is not limited thereto.

In one embodiment, the controller representative object 210 may be designed to have the appearance similar to the layout of the controlling regions 511-514. In one embodiment, the controller representative object 210 may be an interface for the user's reference, so that user 199 knows which region on the controller representative object 210 corresponds to which of the controlling regions 511-514 on the smart device 110 and knows where to touch to use the smart device 110 in a way of using the handheld controller.

Referring back to FIG. 3, the smart device 110 perform S316 to enabling the touch capturing function on the smart device 110. From another perspective, the smart device 110 can be understood as returning to step S311 after step S315, such that the touch capturing function can intercept subsequent touch event happened on the smart device 110. In this case, the smart device 110 can wait and intercept the next touch event. In response to intercepting the next touch event, the smart device 110 can regard this touch event as the first touch event E1 and accordingly perform steps S312-S316, and the host 120 can perform the corresponding steps S322-S324. Details can be referred to the above descriptions.

In the embodiments of the disclosure, the time length for performing steps S313 to S316 could be very short, such that the user 199 may not notice that the touch capturing function has been disabled and enabled. Accordingly, the operations of the user 199 on the smart device 110 would not be affected.

The disclosure further provides a computer readable storage medium for executing the method for operating a mirrored content under a mirror mode. The computer readable storage medium is composed of a plurality of program instructions (for example, a setting program instruction and a deployment program instruction) embodied therein. These program instructions can be loaded into the smart device 110 and/or the host 120 and executed by the same to execute the method for operating a mirrored content under a mirror mode and the functions of the smart device 110 and/or the host 120 described above.

In summary, the embodiments of the disclosure can enable the touch capturing function for intercepting the first touch event when the smart device and the host are operating under the mirror mode, such that the smart device would not directly perform the corresponding operation in response to the first touch event. In addition, the host can obtain the specific position indicated by the controller representative object in response to the first touch event intercepted by the smart device and accordingly provide the second touch event to the smart device, wherein the second touch event can simulate the situation of the user touches a corresponding touch coordinate on the display screen of the smart device. In this case, the smart device can perform the first operation in response to the second touch event that actually reflecting the behavior of the user. Accordingly, the embodiments of the disclosure provide a solution for the user to use the smart device as a handheld controller under the mirror mode.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for operating a mirrored content under a mirror mode, comprising:
    enabling, by a smart device, a touch capturing function on the smart device, wherein the touch capturing function intercepts a touch event inputted to the smart device;
    in response to determining that a raw touch event is intercepted by the smart device, translating, by the smart device, the raw touch event to a first touch event and sending, by the smart device, the first touch event to a host, wherein a display screen of the smart device is mirrored to a visual content shown by the host, and the first touch event triggers the host to report a second touch event happened in the visual content;
    disabling, by the smart device, the touch capturing function and receiving, by the smart device, the second touch event from the host; and
    performing, by the smart device, a first operation in response to the second touch event and enabling, by the smart device, the touch capturing function on the smart device.

2. The method according to claim 1, wherein the display screen of the smart device is mirrored to a specific region of the visual content, the visual content comprises a controller representative object corresponding to the smart device, and the method further comprises:
    in response to receiving the first touch event from the smart device, obtaining, by the host, a specific position indicated by the controller representative object;
    in response to determining that the specific position is within the specific region, accordingly generating, by the host, the second touch event, wherein the second touch event corresponds to a touch coordinate of the specific position relative to the specific region.

3. The method according to claim 2, wherein the controller representative object has a raycast emitted from the controller representative object, and the specific position is a position pointed by the raycast in the visual content.

4. The method according to claim 1, wherein the visual content comprises a controller representative object corresponding to the smart device, and the method further comprises:
    obtaining, by the smart device, a motion data of the smart device;
    providing, by the smart device, the motion data to the host, wherein the motion data triggers the host to move the controller representative object in the visual content in response to the motion data.

5. The method according to claim 1, wherein the step of enabling the touch capturing function on the smart device comprises:
    overlaying, by the smart device, a user interface of the smart device with a cover layer.

6. The method according to claim 5, wherein the cover layer is transparent.

7. The method according to claim 5, wherein the cover layer comprises at least one controlling region, wherein each controlling region is used to activate a system function of a reality service provided by the host.

8. The method according to claim 7, wherein the first touch event happens on a first touch coordinate on the cover layer, and the method further comprises:
    obtaining, by the smart device, a first controlling region of the at least one controlling region where the first touch coordinate locates;
    notifying, by the smart device, the host to activate a first system function corresponding to the first controlling region.

9. The method according to claim 1, wherein the first touch event happens on a first touch coordinate on the cover layer, and the method further comprises:
    in response to determining that the first coordinate locates on a first application shown in the user interface, not launching the first application.

10. The method according to claim 1, wherein the second touch event comprises a touch coordinate, and the step of performing the first operation in response to the second touch event comprises:
    in response to determining that the touch coordinate corresponds to a specific application or a specific function in a user interface of the smart device, activating, by the smart device, the specific application or the specific function.

11. A non-transitory computer readable storage medium, the computer readable storage medium recording an executable computer program, the executable computer program being loaded by a smart device to perform steps of:
    enabling a touch capturing function on the smart device, wherein the touch capturing function intercepts a touch event inputted to the smart device;
    in response to determining that a raw touch event is intercepted by the smart device, translating the raw touch event to a first touch event and sending the first touch event to a host, wherein a display screen of the smart device is mirrored to a visual content shown by the host, and the first touch event triggers the host to report a second touch event happened in the visual content;
    disabling the touch capturing function and receiving the second touch event from the host; and
    performing a first operation in response to the second touch event and enabling the touch capturing function on the smart device.

* * * * *